US010635456B2

(12) United States Patent
Wu et al.

(10) Patent No.: US 10,635,456 B2
(45) Date of Patent: Apr. 28, 2020

(54) METHOD FOR ENTERING OPERATING SYSTEM DESKTOP AND MOBILE INTELLIGENT TERMINAL

(71) Applicant: TENCENT TECHNOLOGY (SHENZHEN) COMPANY LIMITED, Shenzhen (CN)

(72) Inventors: Lu Wu, Shenzhen (CN); Yaoguang Chen, Shenzhen (CN); Yaoxin Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 12 days.

(21) Appl. No.: 15/721,975

(22) Filed: Oct. 2, 2017

(65) Prior Publication Data
US 2018/0024846 A1   Jan. 25, 2018

Related U.S. Application Data

(63) Continuation of application No. PCT/CN2015/097740, filed on Dec. 17, 2015.

(30) Foreign Application Priority Data

May 6, 2015   (CN) .......................... 2015 1 0227671

(51) Int. Cl.
*G06F 9/451*   (2018.01)
*G06F 21/31*   (2013.01)
(Continued)

(52) U.S. Cl.
CPC .............. *G06F 9/451* (2018.02); *G06F 21/31* (2013.01); *G06F 21/36* (2013.01); *G06F 21/42* (2013.01);
(Continued)

(58) Field of Classification Search
CPC ........................... G06F 21/30–46; G06F 3/048
See application file for complete search history.

(56) References Cited

U.S. PATENT DOCUMENTS 6,470,454 B1 * 10/2002 Challener ............... G06F 21/31
                                                                      709/229
7,200,864 B1 *  4/2007 Hollingsworth ........ G06F 21/41
                                                                      705/18

(Continued)

FOREIGN PATENT DOCUMENTS

CN   102457619 A   5/2012
CN   103713825 A   4/2014

(Continued)

OTHER PUBLICATIONS

International Search Report in international application No. PCT/CN2015/097740, dated Mar. 14, 2016.

(Continued)

*Primary Examiner* — Jennifer N To
*Assistant Examiner* — Liang Y Li
(74) *Attorney, Agent, or Firm* — Brinks Gilson & Lione

(57) ABSTRACT

Provided is a method for entering a desktop of an operating system, including: entering a screen locking interface, the screen locking interface displaying a prompt for password input; acquiring an unlocking password input on the screen locking interface; comparing the unlocking password with preset passwords; if the unlocking password is a privacy information setting password, entering a setting interface for setting a hiding function for personal privacy information; or, if the unlocking password is a switching password, entering a desktop of an operating system corresponding to the switching password.

18 Claims, 12 Drawing Sheets

(51) Int. Cl.
  *G06F 21/62* (2013.01)
  *G06F 21/36* (2013.01)
  *G06F 21/42* (2013.01)
  *H04W 12/06* (2009.01)
  *H04L 29/06* (2006.01)
  *H04W 12/00* (2009.01)

(52) U.S. Cl.
  CPC .. *G06F 21/6245* (2013.01); *G06F 2221/2105* (2013.01); *G06F 2221/2117* (2013.01); *H04L 63/0861* (2013.01); *H04W 12/00522* (2019.01); *H04W 12/06* (2013.01)

(56) References Cited

U.S. PATENT DOCUMENTS

| | | | |
|---|---|---|---|
| 8,943,609 B2* | 1/2015 | Yun | G06F 3/04883 726/28 |
| 2004/0082322 A1 | 4/2004 | Tani | |
| 2012/0084734 A1 | 4/2012 | Wilairat | |
| 2012/0110496 A1* | 5/2012 | Lee | G06F 3/0488 715/778 |
| 2013/0145448 A1 | 6/2013 | Newell | |
| 2013/0318598 A1* | 11/2013 | Meacham | G06F 21/36 726/19 |
| 2015/0128060 A1* | 5/2015 | Xu | H04L 67/10 715/739 |
| 2017/0140137 A1* | 5/2017 | Mao | G06F 21/31 |
| 2017/0177858 A1* | 6/2017 | Zhang | G06F 21/31 |

FOREIGN PATENT DOCUMENTS

| | | |
|---|---|---|
| CN | 103778381 A | 5/2014 |
| CN | 103793636 A | 5/2014 |
| CN | 104182662 A | 12/2014 |
| CN | 104424412 A | 3/2015 |
| CN | 104966005 A | 10/2015 |
| JP | 2001345926 A | 12/2001 |
| JP | 2004159022 A | 6/2004 |
| JP | 2009017239 A | 1/2009 |
| JP | 2013540321 A | 10/2013 |
| JP | 2014053778 A | 3/2014 |
| JP | 2014531625 A | 11/2014 |
| JP | 2015060387 A | 3/2015 |
| WO | 2015172693 A1 | 11/2015 |

OTHER PUBLICATIONS

English Translation of the Written Opinion of the International Search Authority in international application No. PCT/CN2015/097740, dated Mar. 14, 2016.
English Translation of the Notice of Allowance of Japanese application No. 2018-506466, dated Oct. 29, 2018.
English Translation of the Notification of the First Office Action of Chinese application No. 201510227671.6, dated Dec. 28, 2018.
Office Action dated Sep. 10, 2019 for Chinese Application No. 201510227671.6 with concise English Translation, 8 pages.

* cited by examiner

METHOD FOR ENTERING OPERATING SYSTEM DESKTOP AND MOBILE INTELLIGENT TERMINAL

CROSS-REFERENCE TO RELATED APPLICATIONS

This is a continuation application of International Patent Application No. PCT/CN2015/097740, filed on Dec. 17, 2015, which claims priority to Chinese Patent Application No. 201510227671.6 filed on May 6, 2015, the disclosures of which are incorporated by reference herein in their entireties.

BACKGROUND

A terminal device refers to a terminal device, which possesses an ability of access to the internet, is usually equipped with various operating systems, and may customize various functions according to user demands. The terminal device, particularly a smart phone and a tablet personal computer, is increasingly powerful in function, increasingly low in cost and increasingly high in penetration. The terminal device, serving as a private article of a user, stores private sensitive information including contact information, short messages, call records, photos, Applicants (APP), and the like. In case of lending a terminal device to other people for temporary use, how to effectively protect personal sensitive information in the terminal device becomes an important demand needing to be considered by a software/hardware system of the terminal device.

At present, there are mainly two solutions for protecting personal sensitive information by a terminal device. The first solution refers to an information hiding method under a single-user solution, including: a) hiding some information by means of a hiding function possessed by an operating system of a terminal device; and b) storing some information in an area which cannot be read by common APPs by means of specific APPs such as some butler software capable of storing a picture photographed by a camera in an area which cannot be read by an "album" APP. The second solution refers to an information hiding method under a multi-user solution, including that: operating systems of some mobile terminals support multi-user characteristics, that is, user information under a user A is invisible under a user B, and users achieve the aim of information hiding by switching between different operating systems.

However, the above protection methods for personal sensitive information have a defect of external exposure of an access entry of personal sensitive information. For example, after a "secret photography" function of certain software is started, a specific "secret photography" icon will appear on an interface of a camera APP. Due to external exposure of the access entry of the personal sensitive information, other people may conclude the existence of the personal sensitive information when discovering the existence of the access entry, thereby making it inconvenient to hide the personal sensitive information.

SUMMARY

The disclosure relates to the field of information safety, and in particular to a method for entering a desktop of an operating system, and a terminal device.

Some objectives of the present application are to address the challenges raised above by presenting a set of solutions to improve a user's overall experience of using a virtual reality system.

According to one aspect of the present application, a method for entering a desktop of an operating system may include:

entering, by a terminal device, a screen locking interface in response to a click operation made by a user, the screen locking interface displaying a prompt for password input;

acquiring, by the terminal device, an unlocking password input on the screen locking interface, the unlocking password being a password that enables leaving from the screen locking interface;

comparing, by the terminal device, the unlocking password with preset passwords;

when the unlocking password is a privacy information setting password, entering, by the terminal device, a setting interface for setting a hiding function for personal privacy information; or when the unlocking password is a switching password, entering, by the terminal device, a desktop of an operating system corresponding to the switching password.

According to another aspect of the present application, a terminal device may include a storage medium and a processor. An instruction may be stored in the storage medium. When the instruction is executed by the processor, the processor may be enabled to execute:

entering, by the terminal device, a screen locking interface in response to a click operation made by a user, the screen locking interface displaying a prompt for password input;

acquiring, by the terminal device, an unlocking password input on the screen locking interface, the unlocking password being a password that enables leaving from the screen locking interface;

comparing, by the terminal device, the unlocking password with preset passwords;

when the unlocking password is a privacy information setting password, entering, by the terminal device, a setting interface for setting a hiding function for personal privacy information; or when the unlocking password is a switching password, entering, by the terminal device, a desktop of an operating system corresponding to the switching password.

BRIEF DESCRIPTION OF THE DRAWINGS

The aforementioned implementation of the invention as well as additional implementations will be more clearly understood as a result of the following detailed description of the various aspects of the invention when taken in conjunction with the drawings. Like reference numerals refer to corresponding parts throughout the several views of the drawings.

DETAILED DESCRIPTION

Figure 1:
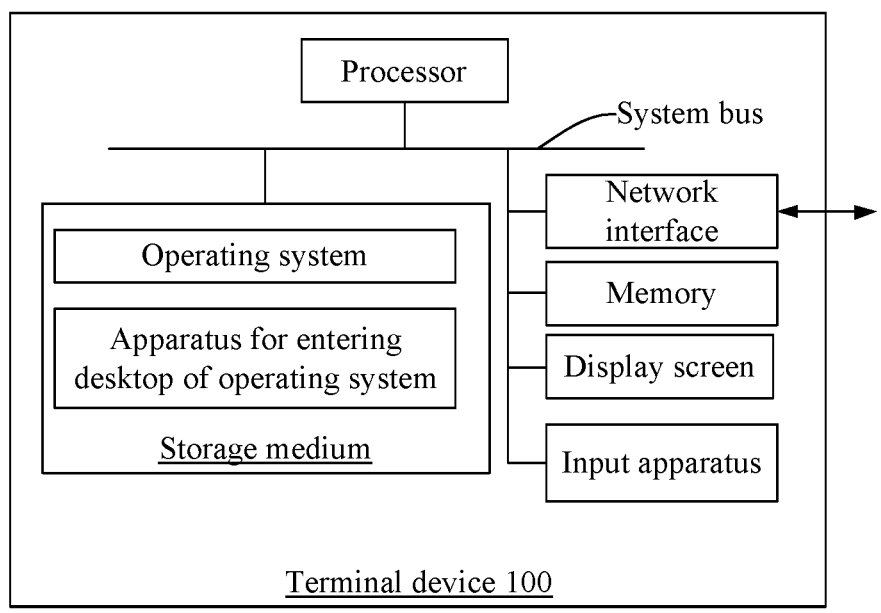
FIG. 1 is an internal structure diagram of a terminal device according to some implementations of the present application.

The description of the following implementations refers to the accompanying drawings, so as to illustrate specific implementations that may be implemented by the present application. Direction terminologies mentioned in the present application, such as "upper", "lower", "front", "rear", "left", "right", "inner", "outer", "side" are only used as reference of the direction of the accompany drawings. Therefore, the used direction terminology is only used to explain and understand the present application, rather than to limit the present application. In the figure, units with similar structures are represented in same reference numerals.

FIG. 1 is an internal structure diagram of a terminal device in an embodiment. As shown in FIG. 1, the terminal device 100 may include a processor, a storage medium, a memory, a network interface, a display screen and an input apparatus, connected by means of a system bus, wherein the storage medium of the terminal device stores an operating system. The terminal device further includes an apparatus for entering a desktop of an operating system. The apparatus for entering a desktop of an operating system is arranged to implement a method for entering a desktop of an operating system. The processor is arranged to provide computation and control capabilities, and supports running of the whole terminal device. The memory in the terminal device provides an environment for running of the apparatus for entering a desktop of an operating system. The network interface is arranged to perform network communication with a server, such as sending of a data download request to the server and receiving data returned by the server. The display screen of the terminal device may be a liquid crystal display screen or an electronic ink display screen. The input apparatus may be a touch layer covering the display screen, may be a button, a track ball or a touch pad disposed on a terminal housing, or may be an external keyboard, touch panel or mouse. The terminal device may be a mobile phone, a tablet personal computer or a personal digital assistant. Those skilled in the art may understand that FIG. 1 merely shows a part of structural diagrams relevant to the solution of this application, and does not limit the terminal device to which the solution of this application is applied, and a specific terminal may include components more than or less than components shown in the figure or a combination of some components, or may have different component layouts.

Figure 2:
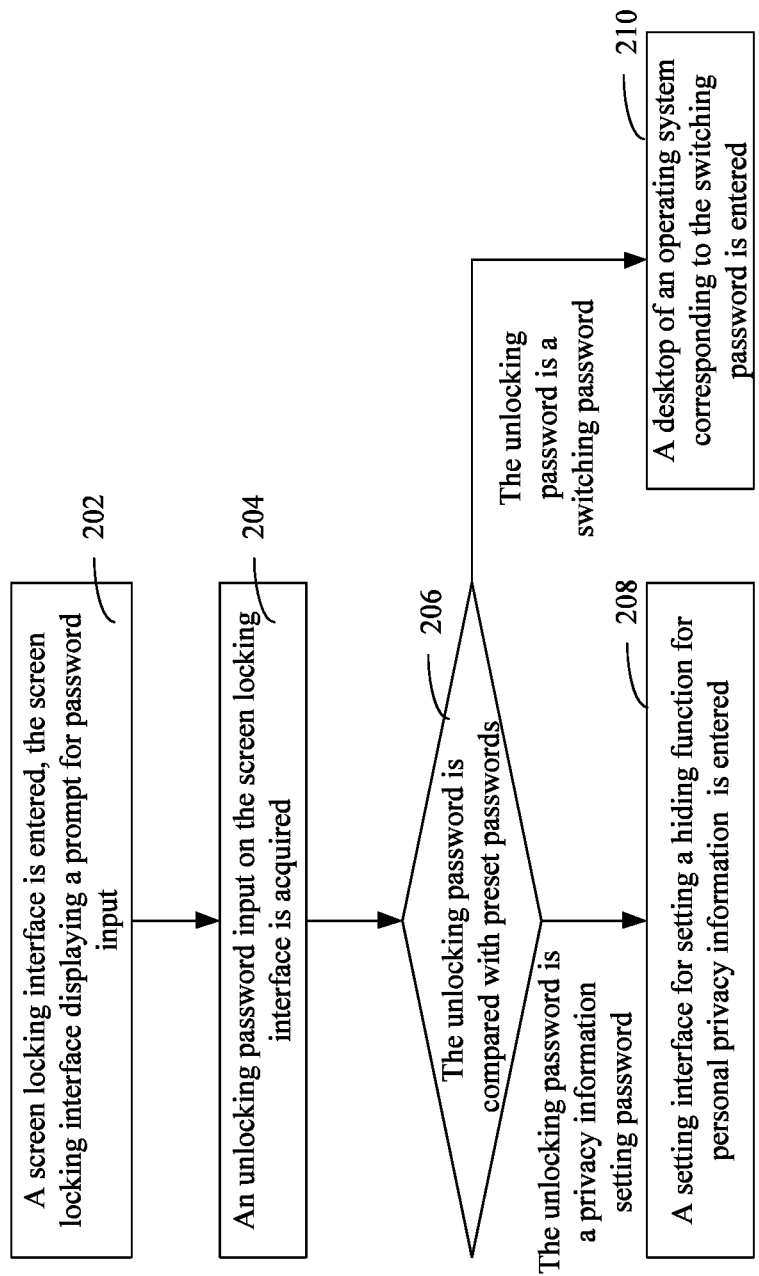
FIG. 2 is a flowchart of a method for entering a desktop of an operating system according to some implementations of the present application.

FIG. 2 is a flowchart of a method for entering a desktop of an operating system in an embodiment. As shown in FIG. 2, a method for entering a desktop of an operating system runs in a terminal device, and includes the steps as follows.

In step 202, a screen locking interface is entered, the screen locking interface displaying a prompt for password input.

Specifically, the screen locking interface may be entered by triggering a home button or a power button. The screen locking interface displays a prompt for password input. For example, if a password is a PIN code, a PIN code input position is provided, and if the password is a pattern, a plurality of points is provided to be connected to draw a pattern.

In step 204, an unlocking password input on the screen locking interface is acquired.

Specifically, screen locking of the terminal device is intended to prevent a user from falsely operating the terminal device, and moreover, it is ensured that the terminal device is only used by a specified user. When the operating system of the terminal device or a terminal provided by a third-party APP does not operate within a certain duration, a screen powering-off or terminal locking function (screen locking) is triggered or triggered by the user, and a terminal locking release function (unlocking) may be achieved by means of a password.

The user inputs an unlocking password on the screen locking interface by means of a finger or other objects. The unlocking password may be a PIN code or a pattern or a general password, wherein the PIN code refers to a password consisting of four or more figures. The pattern refers to a pattern drawn by connecting a plurality of provided points. The general password refers to a password formed by combining one or two of characters and figures. The characters may include letters and special characters. The letters refer to 26 letters includes a, b, c, . . . , z. The special characters may be a symbol "*", "%" and the like.

In step 206, the unlocking password is compared with preset passwords. If the unlocking password is a privacy information setting password, step 208 is executed, and if the unlocking password is a switching password, step 210 is executed.

Specifically, the unlocking password is compared with the preset passwords one by one. If the unlocking password is the same as a preset privacy information setting password, it is shown that the input unlocking password is a privacy information setting password, and a setting interface for setting a hiding function for personal privacy information is entered. If the unlocking password is the same as a preset switching password, it is shown that the input unlocking password is a switching password, and a desktop of an operating system corresponding to the switching password is entered.

The desktop of the operating system refers to a desktop of a corresponding operating system. The desktop may display many application icons and the like.

It is important to note that the unlocking password and the preset passwords are consistent in form. That is to say, if the preset password is a PIN code, the input unlocking password shall be a PIN code. If the preset password is a pattern, the input unlocking password is also a pattern. If the preset password is a general password, the input unlocking password is also a general password.

Figure 3A:
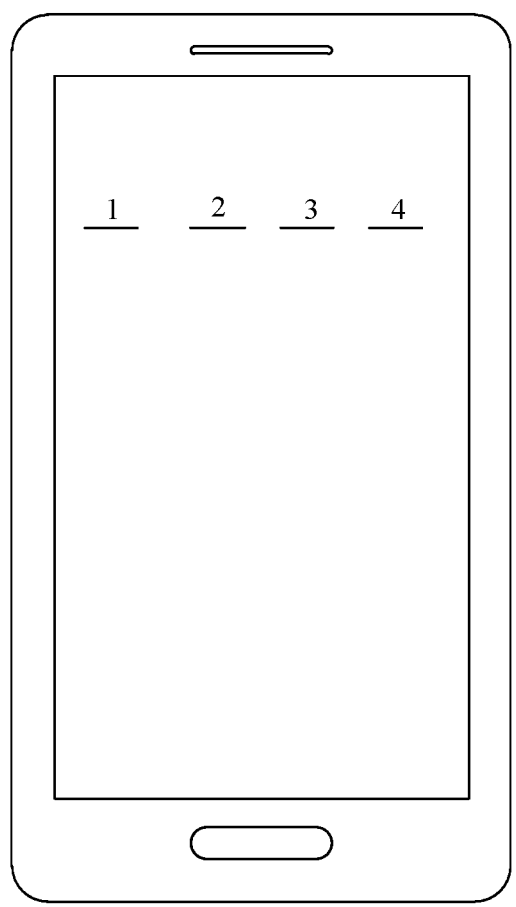
FIG. 3A is a schematic diagram of a PIN code input on a screen locking interface according to some implementations of the present application.

FIG. 3A is a schematic diagram of a PIN code input on a screen locking interface. As shown in FIG. 3A, a PIN code input position is provided on a screen locking interface, and the PIN code input position may be any position on a screen of the terminal device. A PIN code input by means of a soft keyboard or a physical keyboard is received. For example, a PIN code 1234 is input. When the soft keyboard is used, the soft keyboard is automatically started. The input PIN code is compared with a preset PIN code, and if it is judged that the input PIN code is a privacy information setting password or a switching password or an input password is different from the privacy information setting password or the switching password, input errors are shown. The preset passwords may include the privacy information setting password and the switching password. For example, the privacy information setting password may be 1111; the switching password may be 2222 corresponding to a desktop of a first operating system; the switching password may be 3333 corresponding to a desktop of a second operating system.

Figure 3B:
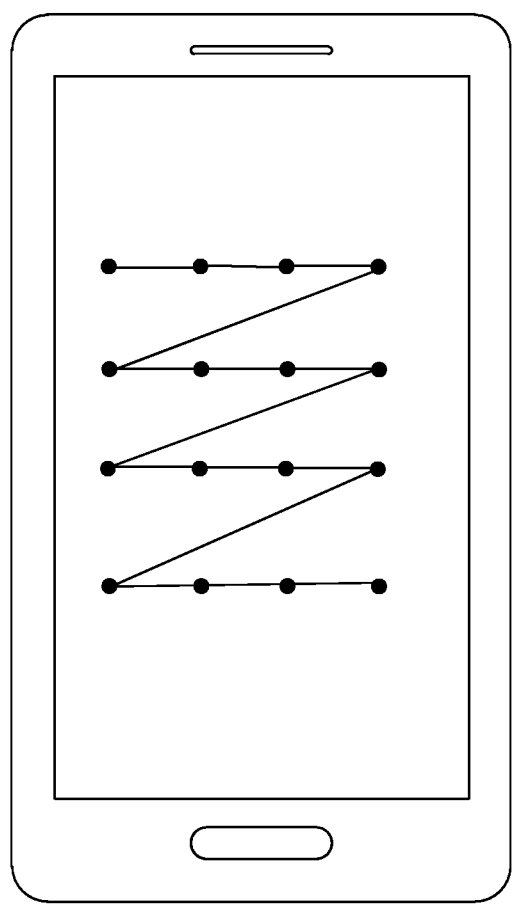
FIG. 3B is a schematic diagram of a pattern input on a screen locking interface according to some implementations of the present application.

FIG. 3B is a schematic diagram of a pattern input on a screen locking interface. As shown in FIG. 3B, a plurality of points of an input pattern is provided on the screen locking interface. The quantity of the points may be 9 or 16. The input pattern refers to a pattern drawn by connecting the plurality of points. If the preset password is a pattern, a plurality of points of the input pattern is provided to be input by a user. A running track connecting all points on the screen locking interface is recorded to form the input pattern, the input pattern is compared with a preset pattern, and if it is judged that the input pattern is a privacy information setting password or a switching password or an input password is different from the privacy information setting password or the switching password, input errors are shown.

Figure 3C:
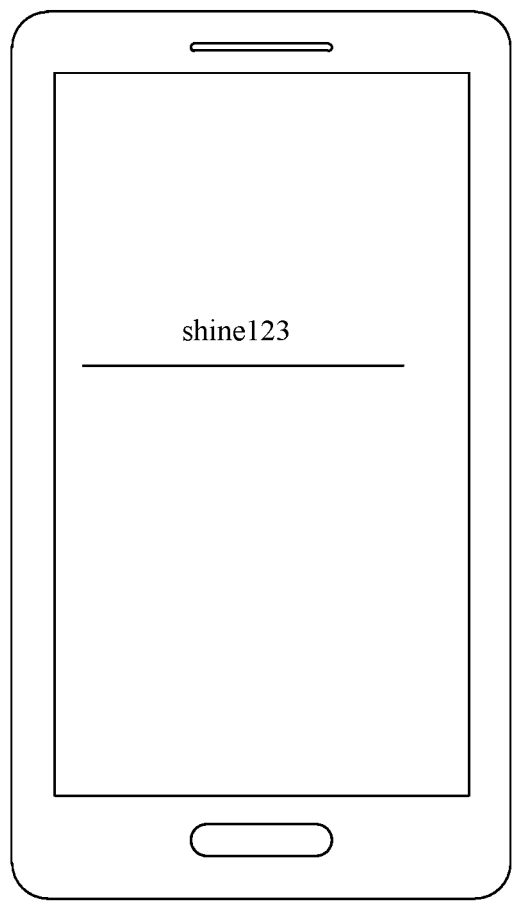
FIG. 3C is a schematic diagram of a general password input on a screen locking interface according to some implementations of the present application.

FIG. 3C is a schematic diagram of a general password input on a screen locking interface. As shown in FIG. 3C, an input position of a general password is provided on the screen locking interface. A general password consisting of characters and/or figures input on the screen locking interface by the user is recorded. The input general password is compared with the preset passwords. If it is judged that the input pattern is a privacy information setting password or a switching password or the input password is different from the privacy information setting password or the switching password, input errors are shown. For example, the input general password is shine123. Letters may also be case-sensitive.

In step 208, a setting interface for setting a hiding function for personal privacy information is entered.

Figure 4:
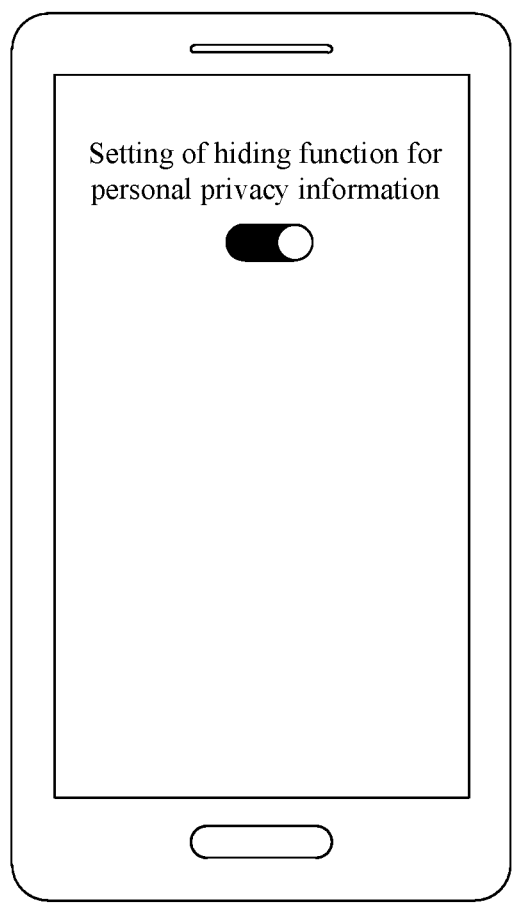
FIG. 4 is a schematic diagram of a setting interface of a hiding function for personal privacy information according to some implementations of the present application.

Specifically, the hiding function for personal privacy information is used for hiding personal privacy information to prevent from being checked by other people. FIG. 4 is a schematic diagram of a setting interface of a hiding function for personal privacy information. As shown in FIG. 4, a function switch may be provided on the setting interface of the hiding function for personal privacy information. When the function switch is under a disabled state, the function switch is triggered to enable the hiding function for personal privacy information. When the function switch is re-triggered, the hiding function for personal privacy information is disabled. After the hiding function for personal privacy information is enabled, APP icons or system menu items of the desktop are hidden. The personal privacy information may include information such as personal data information and personal applications. The personal data information may include personal identity information, personal pictures and the like.

In step 210, a desktop of an operating system corresponding to the switching password is entered.

Specifically, different switching passwords enable entrance to desktops of different operating systems. The unlocking password is compared with the switching passwords, and if the unlocking password is the same as a certain switching password, a desktop of an operating system corresponding to this switching password is entered.

Figure 5A:
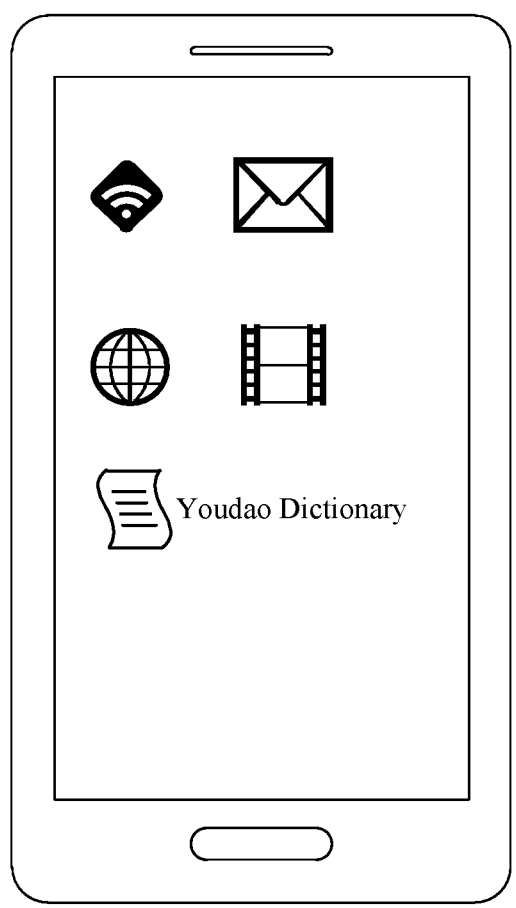
FIG. 5A is a schematic diagram of a desktop of an operating system of a user A according to some implementations of the present application.
Figure 5B:
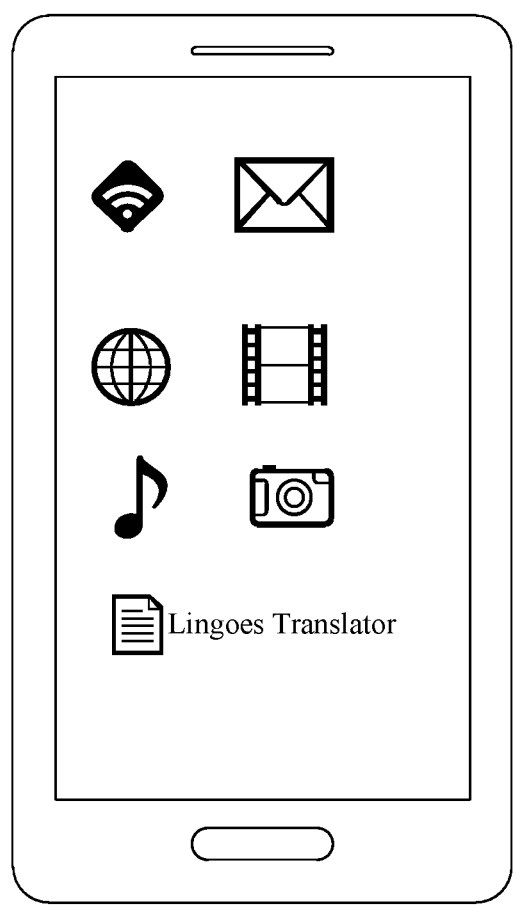
FIG. 5B is a schematic diagram of a desktop of an operating system of a user B according to some implementations of the present application.

FIG. 5A is a schematic diagram of a desktop of an operating system of a user A. FIG. 5B is a schematic diagram of a desktop of an operating system of a user B. As shown in FIG. 5A, a "Youdao Dictionary" is installed on the desktop of the operating system of the user A. As shown in FIG. 5B, a "Lingoes Translator" and the like are installed on the desktop of the operating system of the user B. The switching password of the desktop of the operating system of the user A is different from that of the desktop of the operating system of the user B. Thus, a respective switching password is input to enter a desktop of a corresponding operating system. If a switching password is unknown, the desktop of the corresponding operating system cannot be entered, thus better protecting personal privacy information about a user, and preventing from being acquired by other people.

In the method for entering a desktop of an operating system, an unlocking password acquired on a screen locking interface is compared with preset passwords, if the unlocking password is a privacy information setting password, a setting interface for setting a hiding function for personal privacy information is entered, and if the unlocking password is a switching password, a desktop of an operating system corresponding to the switching password is entered. The unlocking password is input on the screen locking interface, so the screen locking interface may be switched to enter a desktop of a corresponding operating system or running environment, and other people who use the terminal device cannot obtain a hiding function for personal privacy information, and even cannot switch to a desktop of an operating system or running environment storing personal privacy information, thus enhancing the privacy and security of personal privacy information on a terminal device.

In an embodiment, the step of acquiring an unlocking password input on a screen locking interface includes: acquiring a PIN code or a pattern or a general password input on the screen locking interface, wherein a preset password corresponds to the input unlocking password. Specifically, the unlocking password corresponds to the preset password. That is, if the preset password is a PIN code, the input unlocking password shall be a PIN code; if the preset password is a pattern, the input unlocking password is also a pattern; and if the preset password is a general password, the input unlocking password is also a general password.

Figure 6:
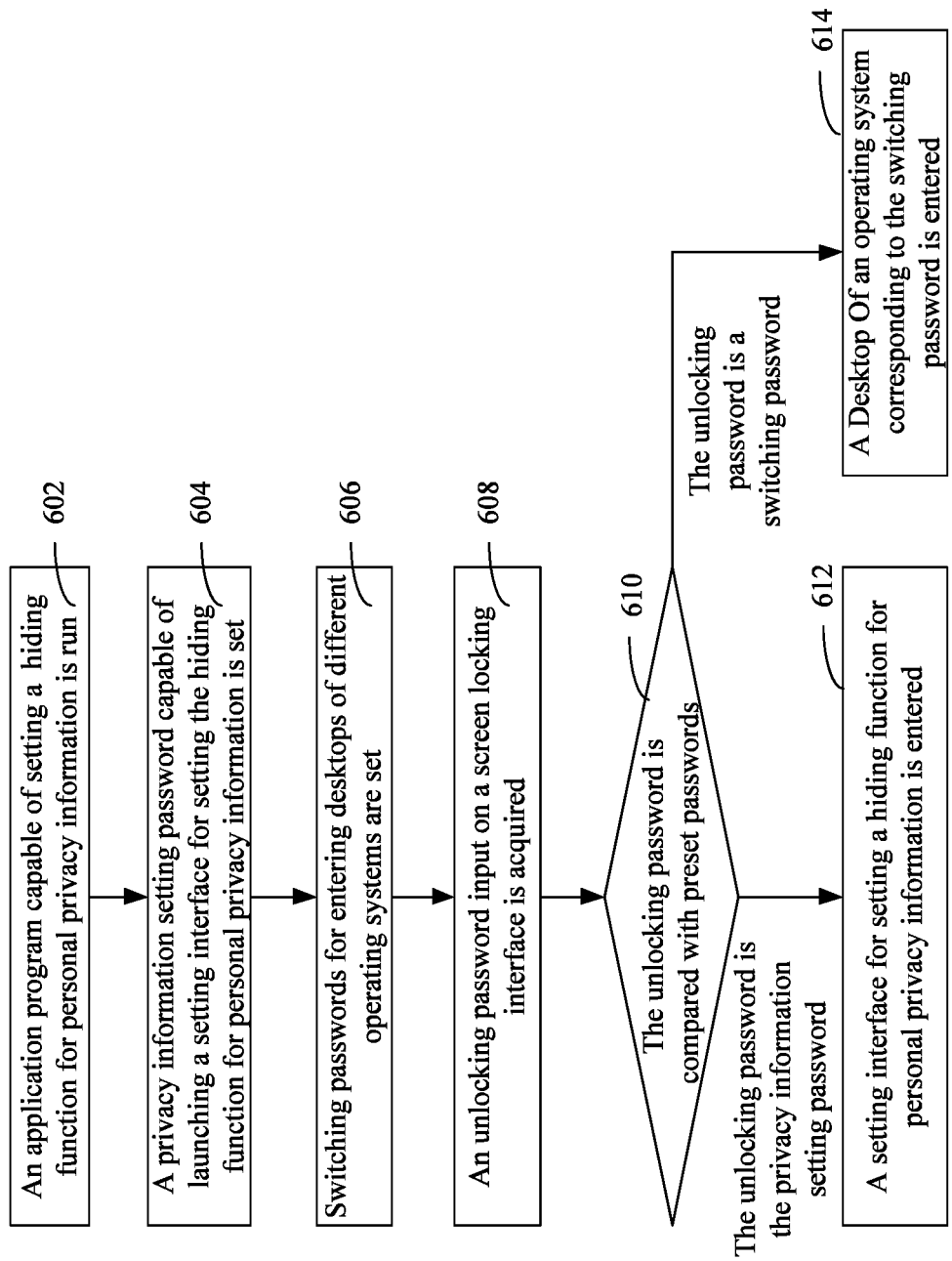
FIG. 6 is a flowchart of a method for entering a desktop of an operating system according to some implementations of the present application.

FIG. 6 is a flowchart of a method for entering a desktop of an operating system in another embodiment. Different from the method in FIG. 2, the method for entering a desktop of an operating system in FIG. 6 additionally has the step of setting a privacy information setting password and a switching password. As shown in FIG. 6, the method for entering a desktop of an operating system includes the steps as follows.

In step 602, an application capable of setting a hiding function for personal privacy information is run.

Specifically, the application capable of setting the hiding function for personal privacy information is run by triggering an application shortcut icon or an application icon.

In step 604, a privacy information setting password capable of launching the setting interface for setting the hiding function for personal privacy information is set.

Specifically, a terminal device receives a privacy information setting password input on the setting interface, and stores the privacy information setting password.

In step 606, switching passwords for entering desktops of different operating systems are set.

Specifically, the terminal device receives the privacy information setting password input on the setting interface, and stores the privacy information setting password.

In step 608, an unlocking password input on a screen locking interface is acquired.

The unlocking password may be a PIN code or a pattern or a general password, wherein the PIN code refers to a password consisting of four or more figures. The pattern refers to a pattern drawn by connecting a plurality of provided points. The general password refers to a password formed by combining one or two of characters and figures. The characters may include letters and special characters. The letters refer to 26 letters including a, b, c, . . . , z. The special characters are "*", "%" and the like.

Before step 608, the method may further include: entering the screen locking interface, the screen locking interface displaying a prompt for password input In step 610, the unlocking password is compared with preset passwords. If the unlocking password is a privacy information setting password, step 612 is executed, and if the unlocking password is a switching password, step 614 is executed.

In step 612, a setting interface for setting a hiding function for personal privacy information is entered.

In step 614, a desktop of an operating system corresponding to the switching password is entered.

Specifically, different switching passwords enable entrance to desktops of different operating systems. The unlocking password is compared with the switching passwords, and if the unlocking password is the same as a certain switching password, a desktop of an operating system corresponding to this switching password is entered.

In the method for entering a desktop of an operating system, start of a hiding function for personal privacy information is ensured by setting a privacy information setting password and a switching password. An unlocking password acquired on a screen locking interface is compared with preset passwords, if the unlocking password is a privacy information setting password, a setting interface for setting a hiding function for personal privacy information is entered, and if the unlocking password is a switching password, a desktop of an operating system corresponding to the switching password is entered. The unlocking password is input on the screen locking interface, so the screen locking interface may be switched to enter a desktop of a corresponding operating system or running environment, and other people who use the terminal device cannot obtain a hiding function for personal privacy information, and even cannot switch to a desktop of an operating system or running environment storing personal privacy information, thus enhancing the privacy and security of personal privacy information on a terminal device.

In an embodiment, the method for entering a desktop of an operating system further includes: before acquiring the unlocking password input on the screen locking interface or running the application capable of setting the hiding function for personal privacy information, installing the application capable of setting the hiding function for personal privacy information.

In an embodiment, the step of installing the application capable of setting the hiding function for personal privacy information includes:

installing the application capable of setting the hiding function for personal privacy information on the terminal device.

Specifically, for example, a mobile phone butler application and the like are installed.

Or, the step of installing the application capable of setting the hiding function for personal privacy information includes: building, into the operating system of the terminal device, the application capable of setting the hiding function for personal privacy information.

Specifically, during delivery of the terminal device, the application capable of setting the hiding function for personal privacy information has been installed on the terminal device, and a user does not need to install an APP finally.

Or, the step of installing the application capable of setting the hiding function for personal privacy information includes: replacing an existing operating system of the terminal device by an operating system with the application capable of setting the hiding function for personal privacy information.

Specifically, on the basis of an operating system of an original manufacturer, the application capable of setting the hiding function for personal privacy information may be integrated to the operating system, and the existing operating system of the terminal device is replaced by the operating system with the application capable of setting the hiding function for personal privacy information in a refurbishment manner.

It is important to note that installation of the application capable of setting the hiding function for personal privacy information enables the terminal device to have an environment of a personal privacy information hiding or protecting function. The installation modes listed above are not limited, and other implementable modes may also be included.

In an embodiment, the method for entering a desktop of an operating system further includes: after entering the setting interface for setting the hiding function for personal privacy information, acquiring an instruction for disabling the hiding function for personal privacy information; and disabling the hiding function for personal privacy information according to the disabling instruction.

Specifically, after entering the setting interface, the hiding function for personal privacy information may be disabled and enabled, the function may be freely set, and the operation is convenient.

Figure 7:
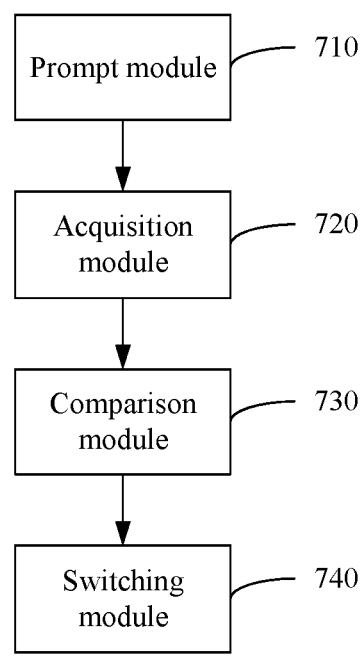
FIG. 7 is a structural diagram of an apparatus for entering a desktop of an operating system in one embodiment of the present application.

FIG. 7 is a structural diagram of an apparatus for entering a desktop of an operating system in an embodiment. As shown in FIG. 7, an apparatus for entering a desktop of an operating system includes a prompt module 710, an acquisition module 720, a comparison module 730, and an entering module 740, wherein the prompt module 710 is arranged to enter a screen locking interface, the screen locking interface displaying a prompt for password input.

Specifically, the screen locking interface may be entered by triggering a home button or a power button. The screen locking interface displays a prompt for password input. For example, if a password is a PIN code, a PIN code input position is provided, and if the password is a pattern, a plurality of points is provided to be connected to draw a pattern.

The acquisition module 720 is arranged to acquire an unlocking password input on the screen locking interface.

Specifically, screen locking of the terminal device is intended to prevent a user from falsely operating the terminal device, and moreover, it is ensured that the terminal device is only used by a specified user. When the operating system of the terminal device or a terminal provided by a third-party APP does not operate within a certain duration, a screen powering-off or terminal locking function (screen locking) is triggered or triggered by the user, and a terminal locking release function (unlocking) may be achieved by means of a password.

The user inputs an unlocking password on the screen locking interface by means of a finger or other objects. The unlocking password may be a PIN code or a pattern or a general password, wherein the PIN code refers to a password consisting of four or more figures. The pattern refers to a pattern drawn by connecting a plurality of provided points. The general password refers to a password formed by combining one or two of characters and figures. The characters may include letters and special characters. The letters refer to 26 letters including a, b, c, . . . , z. The special characters are "*", "%" and the like.

The comparison module 730 is arranged to compare the unlocking password with preset passwords.

Specifically, the unlocking password is compared with the preset passwords one by one. If the unlocking password is the same as a preset privacy information setting password, it is shown that the input unlocking password is a privacy information setting password, and a setting interface for setting a hiding function for personal privacy information is entered. If the unlocking password is the same as a preset switching password, it is shown that the input unlocking password is a switching password, and a desktop of an operating system corresponding to the switching password is entered.

The unlocking password and the preset passwords are consistent in form. That is to say, if the preset password is a PIN code, the input unlocking password shall be a PIN code. If the preset password is a pattern, the input unlocking password is also a pattern. If the preset password is a general password, the input unlocking password is also a general password.

FIG. 3A is a schematic diagram of a PIN code input on a screen locking interface. As shown in FIG. 3A, a PIN code input position is provided on a screen locking interface, and the PIN code input position may be any position on a screen of the terminal device. A PIN code input by means of a soft keyboard or a physical keyboard is received. For example, a PIN code 1234 is input. When the soft keyboard is used, the soft keyboard is automatically started. The input PIN code is compared with a preset PIN code, and if it is judged that the input PIN code is a privacy information setting password or a switching password or an input password is different from the privacy information setting password or the switching password, input errors are shown. The preset passwords may include the privacy information setting password and the switching password. For example, the privacy information setting password may be 1111; the switching password may be 2222 corresponding to a desktop of a first operating system; the switching password may be 3333 corresponding to a desktop of a second operating system.

FIG. 3B is a schematic diagram of a pattern input on a screen locking interface. As shown in FIG. 3B, a plurality of points of an input pattern is provided on the screen locking interface. The quantity of the points may be 9 or 16. The input pattern refers to a pattern drawn by connecting the plurality of points. If the preset password is a pattern, a plurality of points of the input pattern is provided to be input by a user. A running track connecting all points on the screen locking interface is recorded to form the input pattern, the input pattern is compared with a preset pattern, and if it is judged that the input pattern is a privacy information setting password or a switching password or an input password is different from the privacy information setting password or the switching password, input errors are shown.

FIG. 3C is a schematic diagram of a general password input on a screen locking interface. As shown in FIG. 3C, an input position of a general password is provided on the screen locking interface. A general password consisting of characters and/or figures input on the screen locking interface by the user is recorded. The input general password is compared with the preset passwords. If it is judged that the input pattern is a privacy information setting password or a switching password or the input password is different from the privacy information setting password or the switching password, input errors are shown. For example, the input general password is shine123. Letters may also be case-sensitive.

The entering module 740 is arranged to enter, if the unlocking password is a privacy information setting password, a setting interface for setting a hiding function for personal privacy information, and enter, if the unlocking password is a switching password, a desktop of an operating system corresponding to the switching password.

Specifically, the hiding function for personal privacy information is used for hiding personal privacy information to prevent from being checked by other people. FIG. 4 is a schematic diagram of a setting interface of a hiding function for personal privacy information. As shown in FIG. 4, a function switch may be provided on the setting interface of the hiding function for personal privacy information. When the function switch is under a disabled state, the function switch is triggered to enable the hiding function for personal privacy information. When the function switch is re-triggered, the hiding function for personal privacy information is disabled. After the hiding function for personal privacy information is enabled, APP icons or system menu items of the desktop are hidden. The personal privacy information may include information such as personal data information and personal applications. The personal data information may include personal identity information, personal pictures and the like.

Different switching passwords enable entrance to desktops of different operating systems. The unlocking password is compared with the switching passwords, and if the unlocking password is the same as a certain switching password, a desktop of an operating system corresponding to this switching password is entered.

In the apparatus for entering a desktop of an operating system, an unlocking password acquired on a screen locking interface is compared with preset passwords, if the unlocking password is a privacy information setting password, a setting interface for setting a hiding function for personal privacy information is entered, and if the unlocking password is a switching password, a desktop of an operating system corresponding to the switching password is entered. The unlocking password is input on the screen locking interface, so the screen locking interface may be switched to enter a desktop of a corresponding operating system or running environment, and other people who use the terminal device cannot obtain a hiding function for personal privacy information, and even cannot switch to a desktop of an operating system or running environment storing personal privacy information, thus enhancing the privacy and security of personal privacy information on a terminal device.

In an embodiment, the acquisition module 720 is further arranged to acquire a PIN code or a pattern or a general password input on the screen locking interface, a preset password corresponding to the input unlocking password. Specifically, the unlocking password corresponds to the preset password. That is, if the preset password is a PIN code, the input unlocking password shall be a PIN code; if the preset password is a pattern, the input unlocking password is also a pattern; and if the preset password is a general password, the input unlocking password is also a general password.

Figure 8:
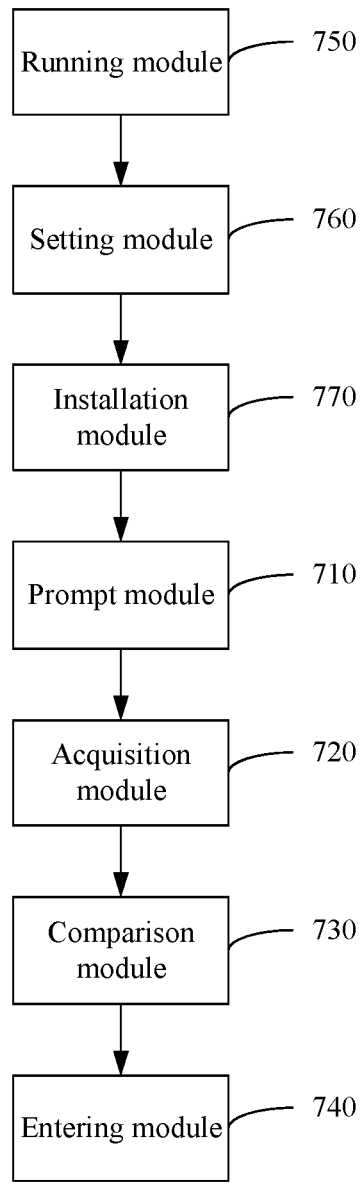
FIG. 8 is a structural diagram of an apparatus for entering a desktop of an operating system in another embodiment of the present application.

FIG. 8 is a structural diagram of an apparatus for entering a desktop of an operating system in another embodiment. As shown in FIG. 8, an apparatus for entering a desktop of an operating system further includes, in addition to the prompt module 710, the acquisition module 720, the comparison module 730 and the entering module 740, a running module 750, a setting module 760 and an installation module 770, wherein the running module 750 is arranged to run, before acquiring the unlocking password input on the screen locking interface, an application capable of setting a hiding function for personal privacy information. Specifically, the application capable of setting the hiding function for personal privacy information is run by triggering an application shortcut icon or an application icon.

The setting module 760 is arranged to set a privacy information setting password capable of launching the setting interface for setting the hiding function for personal privacy information, and set switching passwords for entering desktops of different operating systems. Specifically, a terminal device receives a privacy information setting password input on the setting interface, and stores the privacy information setting password. The terminal device receives the privacy information setting password input on the setting interface, and stores the privacy information setting password.

The installation module 770 is arranged to install, before acquiring the unlocking password input on the screen locking interface, the application capable of setting the hiding function for personal privacy information.

In this embodiment, the installation module 770 is further arranged to install the application capable of setting the hiding function for personal privacy information on the terminal device. Specifically, for example, a mobile phone butler application and the like are installed.

Or, the installation module 770 is further arranged to build, into the operating system of the terminal device, the application capable of setting the hiding function for personal privacy information. Specifically, during delivery of the terminal device, the application capable of setting the hiding function for personal privacy information has been installed on the terminal device, and a user does not need to install an APP finally.

Or, the installation module 770 is further arranged to replace an existing operating system of the terminal device by an operating system with the application capable of setting the hiding function for personal privacy information.

Specifically, on the basis of an operating system of an original manufacturer, the application capable of setting the hiding function for personal privacy information may be integrated to the operating system, and the existing operating system of the terminal device is replaced by the operating system with the application capable of setting the hiding function for personal privacy information in a refurbishment manner.

Figure 9:
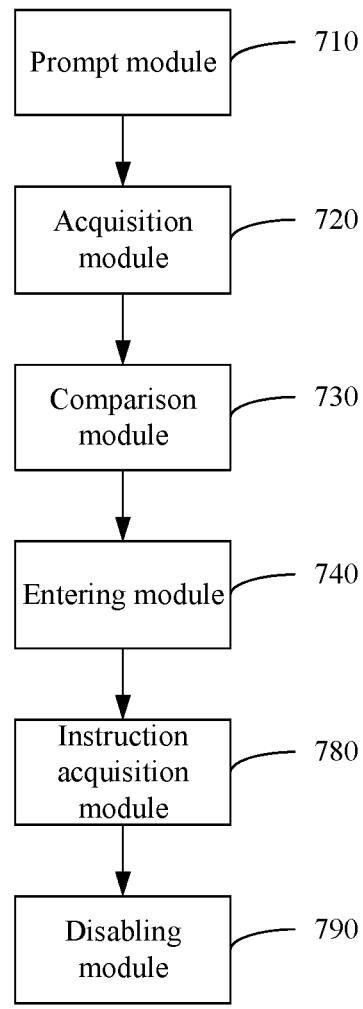
FIG. 9 is a structural diagram of an apparatus for entering a desktop of an operating system in yet another embodiment of the present application.

FIG. 9 is a structural diagram of an apparatus for entering a desktop of an operating system in another embodiment. As shown in FIG. 9, an apparatus for entering a desktop of an operating system further includes, in addition to the prompt module 710, the acquisition module 720, the comparison module 730 and the entering module 740, an instruction acquisition module 780 and a disabling module 790, wherein the instruction acquisition module 780 is arranged to acquire, after entering the setting interface for setting the hiding function for personal privacy information, an instruction for disabling the hiding function for personal privacy information.

The disabling module 790 is arranged to disable the hiding function for personal privacy information according to the disabling instruction.

Specifically, after entering the setting interface, the hiding function for personal privacy information may be disabled and enabled, the function may be freely set, and the operation is convenient.

In other embodiments, the apparatus for entering a desktop of an operating system may include all possible combinations of the prompt module 710, the acquisition module 720, the comparison module 730, the entering module 740, the running module 750, the setting module 760, the installation module 770, the instruction acquisition module 780, and the disabling module 790.

Those skilled in the art may understand that all or some flows in the methods in the above-mentioned embodiments may be implemented by instructing related hardware via a computer program. The program may be stored in a non-volatile computer readable storage medium. For example, in the embodiments of the disclosure, the program may be stored in a storage medium of a computer system, and executed by at least one processor in the computer system, so as to implement the flows including the embodiments for each method. Wherein, the storage medium may be a magnetic disk, an optical disc, a Read-Only Memory (ROM) or a Random Access Memory (RAM).

The above-mentioned embodiments only express several implementation modes of the disclosure, and the description is more specific and detailed, but cannot be accordingly interpreted as limits to the patent scope of the disclosure. It shall be pointed out that those skilled in the art may also make some transformations and improvements without departing from the concept of the disclosure, these all falling within the protective scope of the disclosure. Therefore, the protective scope of the patent of the disclosure shall refer to the appended claims.

What is claimed is:

1. A method for entering a desktop of an operating system, comprising:
    entering, by a terminal device, a screen locking interface in response to a click operation made by a user, the screen locking interface displaying a prompt for password input;
    acquiring, by the terminal device, an unlocking password input on the screen locking interface, the unlocking password being a password that enables leaving from the screen locking interface;
    comparing, by the terminal device, the unlocking password with preset passwords;
    when the unlocking password is determined to be a switching password:
    determining, by the terminal device, a plurality of applications available on the terminal device and attributed to the user; and
    displaying, on a display screen of the terminal device, a desktop display of the operating system corresponding to the switching password and the user, wherein the desktop display includes APP icons corresponding respectively to the plurality of applications;

when the unlocking password is determined to be a privacy information setting password, displaying, by the terminal device, a setting interface for setting a hiding function for applications including personal privacy information;

in response to user operation on the setting interface, determining, by the terminal device, a set of privacy applications where the applications including personal privacy information are removed from the plurality of applications available on the terminal device and attributed to the user; and displaying, on a display screen of the terminal device, a privacy desktop display including a set of APP icons corresponding respectively to the set of privacy applications in response to a switching password input.

2. The method according to claim 1, wherein acquiring, by the terminal device, the unlocking password input on the screen locking interface comprises:

acquiring, by the terminal device, a Personal Identification Number (PIN) code or a pattern or a general password input on the screen locking interface, the unlocking password input on the screen locking interface and the preset passwords being in a same form.

3. The method according to claim 1, further comprising: before the step of acquiring, by the terminal device, the unlocking password input on the screen locking interface, running an application capable of setting the hiding function for personal privacy information;

setting the privacy information setting password capable of launching the setting interface for setting the hiding function for personal privacy information; and setting switching passwords for entering desktops of different operating systems.

4. The method according to claim 3, further comprising: before the step of acquiring, by the terminal device, the unlocking password input on the screen locking interface, installing the application capable of setting the hiding function for personal privacy information.

5. The method according to claim 4, wherein installing the application capable of setting the hiding function for personal privacy information comprises:

installing, on the terminal device, the application capable of setting the hiding function for personal privacy information; or building, into an operating system of the terminal device, the application capable of setting the hiding function for personal privacy information; or replace an existing operating system of the terminal device by an operating system with the application capable of setting the hiding function for personal privacy information.

6. The method according to claim 1, further comprising: after providing to display the setting interface for setting the hiding function for applications including personal privacy information, acquiring an instruction for disabling the hiding function for personal privacy information; and disabling the hiding function for personal privacy information according to the disabling instruction.

7. A terminal device, comprising:

a processor; and a storage medium arranged to store instructions, that when executed by the processor, cause the processor to execute the following steps:

entering, by the terminal device, a screen locking interface in response to a click operation made by a user, the screen locking interface displaying a prompt for password input;

acquiring, by the terminal device, an unlocking password input on the screen locking interface, the unlocking password being a password that enables leaving from the screen locking interface;

comparing, by the terminal device, the unlocking password with preset passwords;

when the unlocking password is determined to be a switching password:

determining, by the terminal device, a plurality of applications available on the terminal device and attributed to the user; and displaying, on a display screen of the terminal device, a desktop display of an operating system corresponding to the switching password and the user, wherein the desktop display includes APP icons corresponding respectively to the plurality of applications;

when the unlocking password is determined to be a privacy information setting password:

displaying, by the terminal device, a setting interface for setting a hiding function for applications including personal privacy information;

In response to user operation on the setting interface, determining, by the terminal device, a set of privacy applications where the applications including personal privacy information are removed from the plurality of applications available on the terminal device and attributed to the user; and displaying, on a display screen of the terminal device, a privacy desktop display including a set of APP icons corresponding respectively to the set of privacy applications in response to a switching password input.

8. The terminal device according to claim 7, wherein acquiring, by the terminal device, the unlocking password input on the screen locking interface comprises:

acquiring, by the terminal device, a Personal Identification Number (PIN) code or a pattern or a general password input on the screen locking interface, the unlocking password input on the screen locking interface and the preset passwords being in a same form.

9. The terminal device according to claim 7, wherein before the step of acquiring the unlocking password input on the screen locking interface, the processor of the terminal device is further caused to execute the following steps:

running an application capable of setting the hiding function for personal privacy information;

setting the privacy information setting password capable of launching the setting interface for setting the hiding function for personal privacy information; and setting switching passwords for entering desktops of different operating systems.

10. The terminal device according to claim 9, wherein before the step of acquiring the unlocking password input on the screen locking interface, the processor of the terminal is further caused to execute the following step:

installing the application capable of setting the hiding function for personal privacy information.

11. The terminal device according to claim 10, wherein installing the application capable of setting the hiding function for personal privacy information comprises:

installing, on the terminal device, the application capable of setting the hiding function for personal privacy information; or building, into an operating system of the terminal device, the application capable of setting the hiding function for personal privacy information; or replacing an existing operating system of the terminal device by an operating system with the application capable of setting the hiding function for personal privacy information.

12. The terminal device according to claim 7, wherein the processor of the terminal device is further caused to execute the following steps:

after providing to display the setting interface for setting the hiding function for applications including personal privacy information, acquiring an instruction for disabling the hiding function for personal privacy information; and disabling the hiding function for personal privacy information according to the disabling instruction.

13. A non-transitory computer storage medium having stored therein computer-executable instructions being arranged to execute a method for entering a desktop of an operating system, the method comprising:

entering, by a terminal device, a screen locking interface in response to a click operation made by a user, the screen locking interface displaying a prompt for password input;

acquiring, by the terminal device, an unlocking password input on the screen locking interface, the unlocking password being a password that enables leaving from the screen locking interface;

comparing, by the terminal device, the unlocking password with preset passwords;

when the unlocking password is determined to be a switching password:

determining, by the terminal device, a plurality of applications available on the terminal device and attributed to the user; and displaying, on a display screen of the terminal device, a desktop display of the operating system corresponding to the switching password and the user, wherein the desktop display includes APP icons corresponding respectively to the plurality of applications;

when the unlocking password is determined to be a privacy information setting password, displaying, by the terminal device, a setting interface for setting a hiding function for applications including personal privacy information;

In response to user operation on the setting interface, determining, by the terminal device, a set of privacy applications where the applications including personal privacy information are removed from the plurality of applications available on the terminal device and attributed to the user; and displaying, on a display screen of the terminal device, a privacy desktop display including a set of APP icons corresponding respectively to the set of privacy applications in response to a switching password input.

14. The non-transitory computer storage medium according to claim 13, wherein acquiring, by the terminal device, the unlocking password input on the screen locking interface comprises:

acquiring, by the terminal device, a Personal Identification Number (PIN) code or a pattern or a general password input on the screen locking interface, the unlocking password input on the screen locking interface and the preset passwords being in a same form.

15. The non-transitory computer storage medium according to claim 13, wherein the method further comprises:
before the step of acquiring the unlocking password input on the screen locking interface, running an application capable of setting the hiding function for personal privacy information;

setting the privacy information setting password capable of launching the setting interface for setting the hiding function for personal privacy information; and setting switching passwords for entering desktops of different operating systems.

16. The non-transitory computer storage medium according to claim 15, wherein the method further comprises:
before the step of acquiring the unlocking password input on the screen locking interface, installing the application capable of setting the hiding function for personal privacy information.

17. The non-transitory computer storage medium according to claim 16, wherein installing the application capable of setting the hiding function for personal privacy information comprises:

installing, on the terminal device, the application capable of setting the hiding function for personal privacy information; or building, into an operating system of the terminal device, the application capable of setting the hiding function for personal privacy information; or replacing an existing operating system of the terminal device by an operating system with the application capable of setting the hiding function for personal privacy information.

18. The non-transitory computer storage medium according to claim 13, wherein the method further comprises:

after providing to display the setting interface for setting the hiding function for applications including personal privacy information, acquiring an instruction for disabling the hiding function for personal privacy information; and disabling the hiding function for personal privacy information according to the disabling instruction.

* * * * *